United States Patent Office 3,574,218
Patented Apr. 6, 1971

3,574,218
2-ARYL- OR ARALKYL-SUBSTITUTED BENZAZOLE DERIVATIVES
Kalman Hideg, Olga Hideg nee Hankovszky, Laszlo Szekeres, Gyula Mehes, and Gyula Papp, Pecs, Hungary, assignors to Egyesult Gyogyszer-Es Tapszergyar, Budapest, Hungary
No Drawing. Continuation-in-part of application Ser. No. 643,069, June 2, 1967. This application Aug. 11, 1969, Ser. No. 849,145
Int. Cl. C07d 85/48, 91/44, 49/38
U.S. Cl. 260—293.4      1 Claim

ABSTRACT OF THE DISCLOSURE

New compounds having the general formula

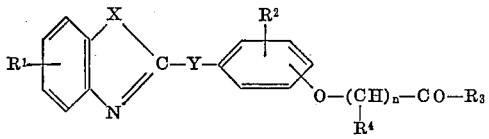

wherein $R^1$ is selected from the group consisting of hydrogen and chlorine, $R^2$ is selected from the group consisting of hydrogen and lower alkoxy, $R^3$ is selected from the group consisting of piperidino and α-methyl-benzylamino radicals, $R^4$ is selected from the group consisting of hydrogen and methyl radical, X is selected from the group consisting of =O, =S, and =NH, Y is selected from the group consisting of direct bond and alkylene having from 1 to 2 carbon atoms, and n is selected from the group consisting of 1 and 2, and the positions of $R^2$ and of the ether bond in the phenyl radical are selected from the group consisting of 2', 3', and 4', and their acid addition salts and quaternary ammonium derivatives. These compounds possess valuable pharmacological properties. They show anti-anginose, coronary vasodilator and peripheral circulation enhancing effects.

---

This application is a continuation-in-part of copending application Ser. No. 643,069 filed June 2, 1967, and now abandoned.

This invention relates to new derivatives of alkylbenzazol having valuable therapeutical activity and to a process for their preparation.

It is known that the 2-benzyl benzimidazol (J. Chem. Soc. 1928, 2393) has an effect of enhancing the circulation in coronary artery and the $O_2$-consumption of the heart muscle (Prod. Pharm. 17, 333[1962]; Fortschr. d. Arzn. Forsch., vol. 6, p. 371, Birkhauser Verlag, 1963). The peripheral vascular-spasm releasing effects of 2-benzyl imidazol is also known. Until now no derivatives of 2-benzyl imidazol simultaneously showing the effects of both compounds were known.

Now it has been found that the compounds having the following general Formula I

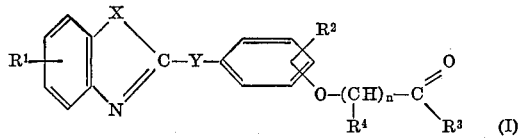

wherein $R^1$ is selected from the group consisting of hydrogen and chlorine, $R^2$ is selected from the group consisting of hydrogen and lower alkoxy, $R^3$ is selected from the group consisting of piperidino and α-methyl-benzylamino radicals, $R^4$ is selected from the group consisting of hydrogen and methyl radical, X is selected from the group consisting of =O, =S, and =NH, Y is selected from the group consisting of direct bond and alkylene having from 1 to 2 carbon atoms, and n is selected from the group consisting of 1 and 2, and the positions of $R^2$ and of the ether bond in the phenyl radical are selected from the group consisting of 2', 3' and 4', show therapeutical effects corresponding to those of both of the known benzylimidazol compounds enumerated above.

The invention includes all the stereoisomers and stereoisomeric mixtures of the compounds of the general Formula I, not only in free-base form, but also their acid salts and quaternary derivatives.

The new compounds of the present invention are conveniently prepared by reacting a benzazol compound of the general Formula II

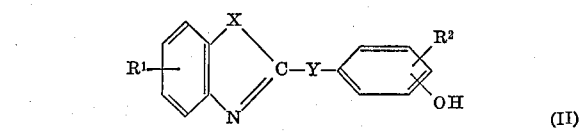

wherein $R^1$, $R^2$, X and Y have the same meanings as above, in the presence of an alkali, preferably NaOH, with a compound having the general Formula III

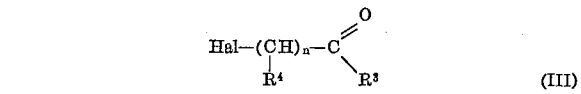

wherein $R^3$, $R^4$, and n have the same meanings as above and Hal stands for halogen, and, if desired, transforming the obtained compound having the general Formula I in a known way to a pharmaceutically acceptable acid salt or to a quaternary derivative.

Some of the starting compounds having the general Formula II are new compounds which can be prepared in analogous way to the known methods, thus e.g. by reacting o-phenylenediamine with hydroxyphenyl acetic acid or benzyl acetic acid, in the presence of hydrochloric acid, to form 2-hydroxy-arylbenzimidazols, or by reacting o-phenylene diamine and hydroxy benzaldehyde (Chem. Ber. 69, 2263 [1936]). A further method consists in heating hydroxy benzamides with o-amino-thiophenol, o-aminophenol or o-phenylenediamine to form hydroxyphenyl benzazols.

The new compounds of the general Formula I possess basic properties and form acid salts as well as quaternary derivatives.

The new compounds according to the invention occur equally in the free base, acid salt and quaternary forms. In some instances it can be desirable to obtain the acid salt or the quaternary derivative from the free base. In this case, the salt can be prepared by reacting the free base with the corresponding inorganic or organic acids, such as hydrochloric, hydrobromic, maleic, fumaric, ethanesulphonic, 1,1'- methylene - bis-(2-naphthol-3-carboxylic), sulphuric, phosphoric, acetic, citric and other pharmaceutically acceptable acids, preferably in the presence of a suitable solvent permitting isolation of the salt. The quaternary derivatives can be prepared by reacting the free base with a halogen-alkyl compound, preferably in the presence of an indifferent solvent.

On the other hand, in those instances, where it is desired to convert the acid salt or the quaternary derivative to the free base, this can be accomplished by dissolving the salt in a suitable solvent, neutralizing the solution with a basic material, such as sodium hydroxide and the like, and isolating the desired base by extraction or other suitable means.

The compounds of this invention possess valuable pharmacological properties for human therapy. Thus they show anti-anginose, coronary vasodilator and peripheral circulation enhancing effects, these effects being more powerful than those of the 2-benzyl benzimidazol. The therapeutical indices of the new compounds are more favorable than those of papaverin or prenylamine. Moreover, the compounds according to the invention are by an order of magnitude better soluble than the latter compounds and their resorption is more favorable.

The compounds of the general Formula I as well as their acid salts and quaternary derivatives can be transformed to pharmaceutically usable products by adjusting them alone or combined with other biologically active compounds, if desired, together with binding, filling, surface-active, flavoring, etc. agents usable in the pharmaceutical industry, in a known way, to medicines.

Specifically, the compounds according to the present invention can be administered orally or parenterally in a dosage range of 0.10 to 0.60 gram per day for adult humans and in other mammals at a dosage for example of 2 to 4 mg./kg. body weight; although no toxicity has been detected even at dosages as high as 20 mg./kg. of body weight. The oral preparations preferably contain 20–70 percent by weight of the compounds in pharmaceutically acceptable carriers, additives and/or excipients, for example, lactose, starch, magnesium stearate, talc or polyvinyl pyrrolidone.

The effect of compounds according to the present invention on the coronary circulation of dogs can also be demonstrated quantitatively according to the method of Pavek et al. (Pavek et al.: Circulation Research 15, 311, 1964).

The invention is further illustrated by the aid of the following examples which are given for the purpose of illustration only and are not to be construed as limit of invention in spirit or in scope.

EXAMPLE 1

21.02 g. (0.1 mole) of 2-(2'-hydroxyphenyl)-benzimidazol are dissolved in 200 ml. of ethanol. 4 g. (0.1 mole) of NaOH dissolved in a small amount (5–10 ml.) of water are added, The dissolution is rendered complete by warming, whereafter 14.96 g. (0.1 mole) of N-diethyl-chloroacetamide are added. The reaction mixture is boiled under reflux cooler until the separation of NaCl is finished, that is, the reaction is completed. Then the reaction mixture is diluted with acetone whereby the separation of NaCl is rendered more complete. The NaCl is filtered; its weight amounts to 5.1 g. From the filtrate, after diluting with water, the 2-[o-(2-benzimidazolyl)-phenoxy]-N.N-diethylacetamide separates. M.P. 122–125° C.; yield: 24 g. (74 percent).

After recrystallizing from aqueous acetone, the melting point shows no change.

The monochlorohydrate of the compound is prepared by adding ethanol containing hydrochloric acid (1:1) to and then diluting with ethylether the ethanolic solution of the base.

The 2-(2'-hydoxyphenyl)-benzimidazol is prepared in the following way:

54 g. (0.5 mole) of o-phenylenediamine and 68.5 g. (0.5 mole) of salicylamide are heated for 5 hours at a temperature of 200 to 250° C. under reflux cooler provided with a tube for leading away the gases being evolved. The melt obtained is allowed to stand and the solidified substance is recrystallized from ethanol, methanol, or ethylether. M.P. 243–245° C.; yield: 94.5 g. (90 percent).

The compounds having the general Formula I obtained by the same method as described in Example 1 are given in the following table.

| Example No. | $R^1$ | $R^2$ | $R^3$ | $n$ | $R^4$ | X | Y | Yield, percent | M.P., °C. | Formula (mol weight) | Position of ether bond |
|---|---|---|---|---|---|---|---|---|---|---|---|
| 2 | H | H | $-N(C_2H_5)_2$ | 1 | H | NH |  | 74 | 122–125 / 204–206 | $C_{19}H_{21}N_3O_2$ (323.40) / $C_{19}H_{21}N_3O_2 \cdot HCl$ (359.87) | 2' |
| 3 | H | H | Same as above | 1 | H | O |  | 60 | 100–102 | $C_{19}H_{20}N_2O_3 \cdot HCl$ (360.85) | 2' |
| 4 | H | H | do | 1 | H | S |  | 65 | 46–49 / 76–79 | $C_{19}H_{20}N_2O_2S$ (340.45) / $C_{19}H_{20}N_2O_2S \cdot HCl$ (377.10) | 2' |
| 5 | H | 3'-$CH_3O$ | do | 1 | H | NH |  | 90 | 115–116 / 179–180 | $C_{20}H_{23}N_3O_3$ (353.43) / $C_{20}H_{23}N_3O_3 \cdot HCl$ (389.89) | 4' |
| 6 | H | H | (piperidino) | 1 | H | NH | $-CH_2-$ | 52 | 86–90 / 195–198 | $C_{21}H_{23}N_3O_2$ (349.44) / $C_{21}H_{23}N_3O_2 \cdot HCl$ (385.90) | 4' |
| 7 | H | H | $-N(C_2H_5)_2$ | 1 | H | NH | $-CH_2-$ | 90 | 159–161 | $C_{20}H_{23}N_3O_2 \cdot HCl$ (373.89) | 4' |
| 8 | H | H | $-N(C_3H_7)_2$ | 1 | H | NH | $-CH_2-$ | 65 | 126–128 | $C_{22}H_{27}N_3O_2 \cdot HCl$ (401.94) | 4' |
| 9 | H | H | $-N(C_4H_9)_2$ | 1 | H | NH | $-CH_2-$ | 70 | 134–136 | $C_{24}H_{31}N_3O_2 \cdot HCl$ (429.99) | 4' |
| 10 | 5/6/Cl | H | $-N(C_2H_5)_2$ | 1 | H | NH | $-CH_2-$ | 75 | 92–93 | $C_{20}H_{22}ClN_3O_2 \cdot HCl$ (408.34) | 4' |
| 11 | H | H | Same as above | 1 | $CH_3$ | NH | $-CH_2-$ | 85 | 89–90 | $C_{21}H_{25}N_3O_2 \cdot HCl$ (387.92) | 4' |
| 12 | H | H | $-NH-CH(CH_3)(C_6H_5)$ | 1 | H | NH |  | 92 | 108–182 | $C_{23}H_{21}N_3O_2 \cdot HCl$ (407.90) | 2' |

What we claim is:
1. A pharmaceutically active compound selected from the group consisting of compounds having the following general Formula I

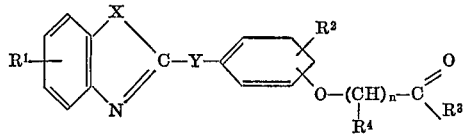

wherein $R^1$ is selected from the group consisting of hydrogen and chlorine, $R^2$ is selected from the group consisting of hydrogen and lower alkoxy, $R^3$ is selected from the group consisting of piperidino and α-methyl-benzylamino radicals, $R^4$ is selected from the group consiting of hydrogen and methyl radical, X is selected from the group consisting of =O, =S, and =NH, Y is selected from the group consisting of direct bond and alkylene having from 1 to 2 carbon atoms, and $n$ is selected from the group consisting of 1 and 2, and the positions of $R^2$ and of the ether bond in the aromatic phenyl radical are selected from the group consisting of 2', 3' and 4', their pharmaceutically acceptable acid addition salts and lower alkyl quaternary ammonium derivatives.

References Cited

Szabadalmi Kozlony, vol. 73, pages 18, 26, Hungarian Foreign Patent Journal, 1968 (abstracts Hungarian Patent 154,323).

HENRY R. JILES, Primary Examiner

S. D. WINTERS, Assistant Examiner

U.S. Cl. X.R.

260—294.7, 304, 309.2, 562; 424—267, 270, 272, 273